(No Model.) 2 Sheets—Sheet 1.

G. W. REXICKER.
WASTE PAPER PRESS.

No. 497,818. Patented May 23, 1893.

Witnesses:
F. P. Kersten
Chas. J. Buchheit

Inventor.
George W. Rexicker
By Miller & Hodder
Attorneys.

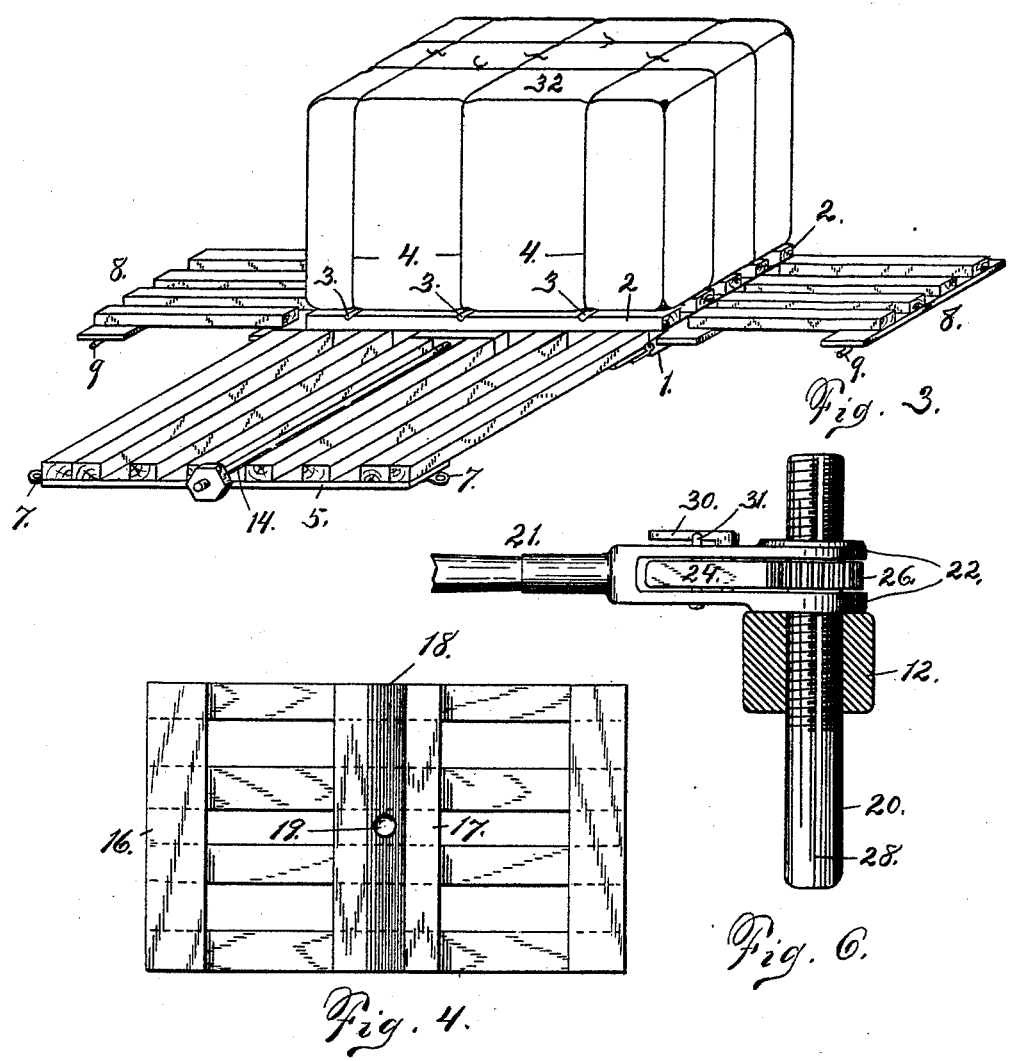

UNITED STATES PATENT OFFICE.

GEORGE W. REXICKER, OF BUFFALO, NEW YORK, ASSIGNOR OF TWO-THIRDS TO CHARLES F. KURTZMANN AND WILLIAM S. SERVIS, OF SAME PLACE.

WASTE-PAPER PRESS.

SPECIFICATION forming part of Letters Patent No. 497,818, dated May 23, 1893.

Application filed October 12, 1892. Serial No. 448,693. (No model.)

*To all whom it may concern:*

Be it known that I, GEORGE W. REXICKER, a citizen of the United States, residing at Buffalo, in the county of Erie and State of New York, have invented certain new and useful Improvements in Waste-Paper Presses; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a press of simple construction and easy manipulation into which waste-paper may be placed and compressed into compact bales for disposal to dealers in that article.

Merchants and manufacturers have long been puzzled to know how to conveniently store waste-paper before its disposal owing to its extreme bulk. To decrease this bulk in an inexpensive manner so that the waste paper can be quickly and easily handled is what I seek to accomplish and to this end my invention consists of a latticed cage or frame work in which the four sides are separately hinged to the bottom and provided with means for securing them together in an upright position. A removable frame or press is provided, which fits loosely within the four sides and is adapted to be forced down upon the contained waste-paper. When the bale is complete the press is removed, the bale properly tied and the four sides unfastened and thrown down when the complete bale can be removed.

I will now minutely describe the manner in which I have carried out my invention and then claim what I believe to be novel.

Figure 1:
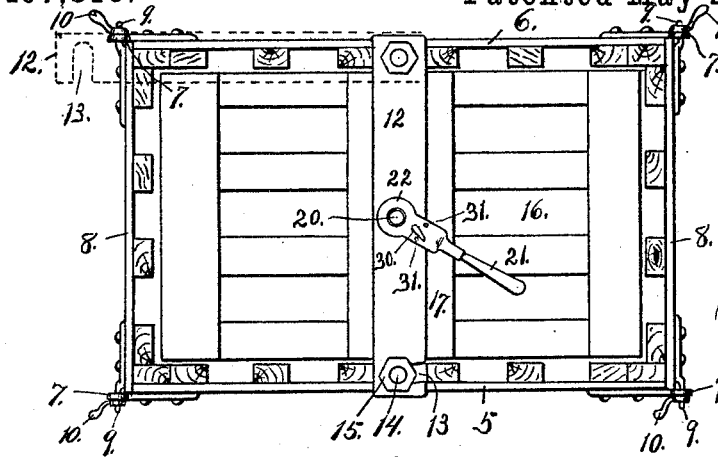
Figure 2:
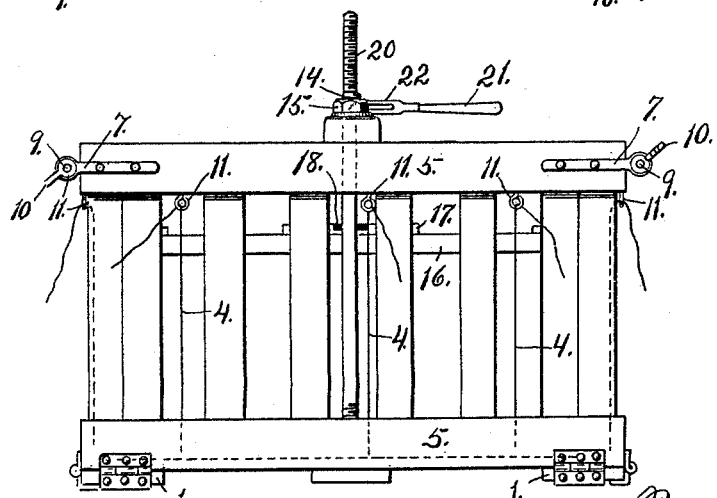
Figure 5:
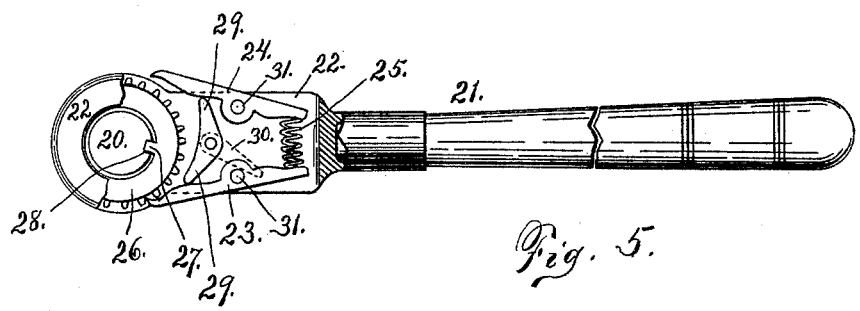

In the drawings:—Figure 1 is a top plan view, and Fig. 2 is a side elevation of my complete device. Fig. 3 shows my device ready for the removal of the complete bale. Fig. 4 is a detached detail view of the movable frame or press, and Figs. 5 and 6 are similar views of the ratcheted lever.

Referring to the drawings, 1 is the latticed bottom having the cross-pieces 2 in which are cut the small grooves 3 for the reception of the binding cords 4.

5 and 6 are the longer latticed sides hinged to the bottom 1 in such a manner that they can be raised to a vertical position. Upon their tops at each end are secured the metallic eyes 7. The latticed ends 8. 8. are similarly hinged to the bottom 1, and are provided with the screw-threaded pins 9 which pass loosely through the eyes 7 of the sides 5 and 6, and the nuts 10 hold them in temporary engagement. Small eyes 11 in the latticed sides temporarily hold the ends of the binding cords 4.

12 is a metal cross-piece hinged to the side 6 and adapted to be swung horizontally out of the way as shown by dotted lines in Fig. 1. Its free end is provided with a recess 13 which engages with a rod 14 secured in the side 5 and a securing nut 15 holds them in engagement.

16 is the removable frame or press also latticed, its central cross-piece 17 having secured upon its upper surface the metallic strip 18 having the central socket 19. See Fig. 4.

20 is a rod in screw-threaded engagement with the metal cross-piece 12, its lower end being adapted for engagement with the socket 19 in the frame 16. The rod 20 is raised or lowered in the cross-piece 12 by the ratcheted lever 21 constructed and operated as follows: The operating handle has the bifurcated end 22 within which are pivoted the twin pawls 23 and 24 having a spiral spring 25 interposed between them. 26 is a ratchet wheel separate from the lever and loosely keyed to the screw threaded rod 20 by the engagement of its inner spur 27 with the groove 28 in the rod 20. The movement of this ratchet wheel turns the screw-threaded rod 20 up or down in the cross-piece 12. To effect either one of these movements it is only necessary to throw one of the twin pawls into engagement and the other out of engagement with the ratchet wheel. This is done by the two-winged piece 29 pivoted within the bifurcated end 22 of the lever and between the twin-pawls 23 and 24. An outside lever 30 is rigidly secured to the piece 29 and plays between the two pins 31 to which the twin-pawls are pivoted and which extend upwardly beyond the handle for that purpose. By throwing the lever 30 over in either direction the two winged piece 29 causes the pawl 23 to engage the ratchet wheel 26 and throws the other pawl 24 out of engagement or vice-versa causing the rod 20 to raise or lower as desired.

I do not wish to be confined to the form of ratchet lever just described as other devices could be used with equally good effect. The sides of the receptacle are preferably latticed so that the air can be readily expelled from the paper during the compression and a much more compact bale formed.

In operation the sides 5, 6, 8, 8, are secured together as already indicated and the binding cords placed in position. The waste-paper to be pressed is then placed within the prepared receptacle and the frame or press 16 laid in position thereon. The cross-piece 12 is then swung across and secured in position after which the screw 20 and its ratchet lever are properly adjusted so that the lower end of rod 20 engages with the socket 19 in the frame 16. As the rod 20 descends by the action of the lever 21 the waste paper is compressed. The compressing mechanism is then removed and fresh supplies of paper added and pressed until the bale 32 is of the required size when the sides are thrown down as shown in Fig. 3 and the binding cords securely tied around the bale which can then be lifted off in complete order for disposal as desired.

I claim—

1. The waste-paper press consisting of the latticed bottom 1, the latticed sides 5, 6, hinged to the bottom 1, the latticed ends 8, 8, hinged to the bottom 1, the sides and ends being provided with temporary uniting devices, the frame 16, the metallic cross-piece 12 hinged to the latticed side 6 and adapted for engagement with the latticed side 5, the screw thread rod 20, in engagement with the metallic cross-piece 12 all combined with a press operating mechanism and operating substantially as shown and described.

2. The waste-paper press consisting of the latticed bottom 1, the latticed sides 5, 6, hinged to the bottom 1 and provided with the metallic eyes 7, the latticed ends 8, 8, hinged to the bottom 1, and provided with the metallic screw-threaded pins 9 adapted to be secured in the eyes 7 by the nuts 10, the frame or press 16 having socket 19, the metallic cross-piece 12 hinged to the latticed side 6 and adapted for engagement with the latticed side 5 through the rod 14 and securing nut 15, the screw-threaded rod 20, mounted in the metallic cross-piece 12, and adapted to engage the socket 19, and mechanism for rotating said rod, all combined with a press operating mechanism and operating substantially as shown and described.

3. A waste paper press consisting of a bottom, sides independently hinged to the bottom, pins and eyes carried by said sides and adapted to connect them when raised, a horizontally swinging beam pivoted on one of the sides and having its free end adapted to engage and be locked to the opposite side, a compressing rod mounted in and carried by said beam, and a follower mounted loosely between the sides and engaged by the compressing rod.

In testimony whereof I have signed my name to this specification in the presence of two subscribing witnesses.

GEORGE W. REXICKER.

Witnesses:
W. T. MILLER,
F. P. KERSTEN.